(12) United States Patent
Duarte et al.

(10) Patent No.: US 9,065,872 B1
(45) Date of Patent: Jun. 23, 2015

(54) SHARING SERVICE MANAGEMENT (71) Applicant: Google Inc., Mountain View, CA (US)

(72) Inventors: Matias Gonzalo Duarte, Mountain View, CA (US); Daniel Marc Gatan Shiplacoff, Los Altos, CA (US); Richard Eugene Fulcher, Sunnyvale, CA (US); Jeremy Lyon, Sunnyvale, CA (US); Adam William Powell, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/862,319

(22) Filed: Apr. 12, 2013

Related U.S. Application Data

(60) Provisional application No. 61/716,406, filed on Oct. 19, 2012.

(51) Int. Cl.
*G06F 3/048* (2013.01)
*H04L 29/06* (2006.01)

(52) U.S. Cl.
CPC .................................. *H04L 65/403* (2013.01)

(58) Field of Classification Search
CPC ...................................................... G06F 3/048
USPC .................................................. 715/753, 811
See application file for complete search history.

(56) References Cited

U.S. PATENT DOCUMENTS

| | | | | |
|---|---|---|---|---|
| 5,644,736 A * | 7/1997 | Healy et al. | ................... | 715/784 |
| 2004/0135816 A1* | 7/2004 | Schwartz et al. | ............. | 345/811 |
| 2009/0313343 A1* | 12/2009 | Brady et al. | ................... | 709/206 |
| 2011/0167110 A1* | 7/2011 | Hoffberg et al. | ............... | 709/203 |
| 2011/0296346 A1* | 12/2011 | Chen et al. | ..................... | 715/811 |

OTHER PUBLICATIONS

"Adding a Share Button to your Android Apps", Smith, Oct. 9, 2011 available at http://androidthings.blogspot.com/2011/10/adding-share-button-to-your-android.html (hereinafter Smith).*
Klout, "Klout for iPhone," Retrieved from https://itunes.apple.com/us/app/klout-for-iphone/id517089691?mt=8, accessed on Jul. 18, 2012, 2 pp.

(Continued)

*Primary Examiner* — Matthew Ell
(74) *Attorney, Agent, or Firm* — Shumaker & Sieffert, P.A.

(57) ABSTRACT

Techniques are described for sharing service management on a computing system. The computing system includes a display device and one or more processors. The processors are configured to determine, based on a context associated with an object, a plurality of weighted probabilities including a respective weighted probability for each sharing service from a plurality of sharing services, wherein the context includes at least one of a characteristic of the object and a respective characteristic of at least a portion of sharing services from the plurality of sharing services, select, based on the respective weighted probabilities, a subset of sharing services, output, for display at the display device, an indication of each sharing service from the subset of sharing services, receive an indication of a user input corresponding to a selection of one of the subset of sharing services, and transmit, using the selected sharing service, an indication of the object.

20 Claims, 6 Drawing Sheets

(56) References Cited

OTHER PUBLICATIONS

Nelson, "Customize the Dock: Add a Recent Applications Stack to the Dock," Retrieved from http://macs.about.com/od/usingyourmac/qt/dockrecentitem.htm, accessed on Jul. 18, 2012, 2 pp.

Muldoon, "How to Integrate Facebook, Twitter and Google + IN WordPress," Retrieved from http://wp.smashingmagazine.com/2012/01/19/facebook-twitter-google-wordpress/, Jan. 19, 2012, 19 pp.

* cited by examiner

SHARING SERVICE MANAGEMENT

RELATED APPLICATION

This application claims the benefit of U.S. Provisional Patent Application No. 61/716,406, filed Oct. 19, 2012, the entire content of which is hereby incorporated by reference.

BACKGROUND

As the number and variety of computerized sharing services increases, some computing devices may have several sharing service-related applications installed thereon. However, such a large number of sharing service-related-applications may make it more difficult and time consuming for a user of the computing device to locate and select a specific sharing service.

SUMMARY

In one example, a method includes determining, by a computing device and based on a context associated with an object, a plurality of weighted probabilities including a respective weighted probability for each sharing service from a plurality of sharing services, wherein the context includes at least one of a characteristic of the object and a respective characteristic of at least a portion of sharing services from the plurality of sharing services. The may method further include selecting, by the computing device and based on the respective weighted probabilities, a subset of sharing services from the plurality of sharing services, and outputting, by the computing device and for display, an indication of each sharing service from the subset of sharing services. The may method further include receiving, by the computing device, an indication of a user input, the user input corresponding to a selection of one of the sharing services from the subset of sharing services, and transmitting, by the computing device and using the selected sharing service, an indication of the object.

In another example, a computer-readable storage medium is encoded with instructions that, when executed, cause one or more processors of a computing device to determine, based on a context associated with an object, a plurality of weighted probabilities including a respective weighted probability for each sharing service from a plurality of sharing services, wherein the context includes at least one of a characteristic of the object and a respective characteristic of at least a portion of sharing services from the plurality of sharing services. The instructions may also cause the one or more processors to select, based on the respective weighted probabilities, a subset of sharing services from the plurality of sharing services, output, for display, an indication of each sharing service from the subset of sharing services, receive an indication of a user input, the user input corresponding to a selection of one of the sharing services from the subset of sharing services, and transmit, using the selected sharing service, an indication of the object.

In another example, a computing system includes a display device and one or more processors. The one or more processors are configured to determine, based on a context associated with an object, a plurality of weighted probabilities including a respective weighted probability for each sharing service from a plurality of sharing services, wherein the context includes at least one of a characteristic of the object and a respective characteristic of at least a portion of sharing services from the plurality of sharing services, and select, based on the respective weighted probabilities, a subset of sharing services from the plurality of sharing services. The one or more processors may also be configured to output, for display at the display device, an indication of each sharing service from the subset of sharing services, receive an indication of a user input, the user input corresponding to a selection of one of the sharing services from the subset of sharing services, and transmit, using the selected sharing service, an indication of the object.

The details of one or more examples are set forth in the accompanying drawings and the description below. Other features and/or advantages will be apparent from the description and drawings, and from the claims.

DETAILED DESCRIPTION

In general, this disclosure is directed to techniques that may enable a computing device to select and display a subset of sharing services available at the computing device, thereby reducing the time and effort required by a user of the computing device to select a sharing service through which to share content. Sharing services may include services provided by applications stored on and executable by a computing device or other applications accessible to the computing device.

In accordance with techniques of the present disclosure, the computing device may automatically determine which sharing services a user is most likely to select in a given context and then present those sharing services to the user. By automatically selecting a portion of the sharing services, techniques of this disclosure may enable a user to more easily and more quickly share content. The selected portion of sharing services may include sharing services preferred by a user or sharing services that may be particularly relevant to the content being shared. For example, the selected sharing services may be frequently selected by the user, may have characteristics desired by the user (e.g., privacy or other content sharing controls), or may be relevant to a context of the computing device (e.g., a location, time of day, etc.).

Techniques of this disclosure may provide one or more advantages. For example, by automatically identifying and suggesting preferred sharing services, techniques of this disclosure may reduce the amount of time required to share information. Techniques of this disclosure may improve sharing service suggestions by "learning" user preferences over time, e.g., by analyzing the sharing context and previous sharing service user selections. By limiting the number of sharing services initially presented to a user and by intelligently selecting the sharing services to suggest to the user, techniques of this disclosure may provide a better user experience and may reduce the effort required by the user to share information with other users.

Figure 1:
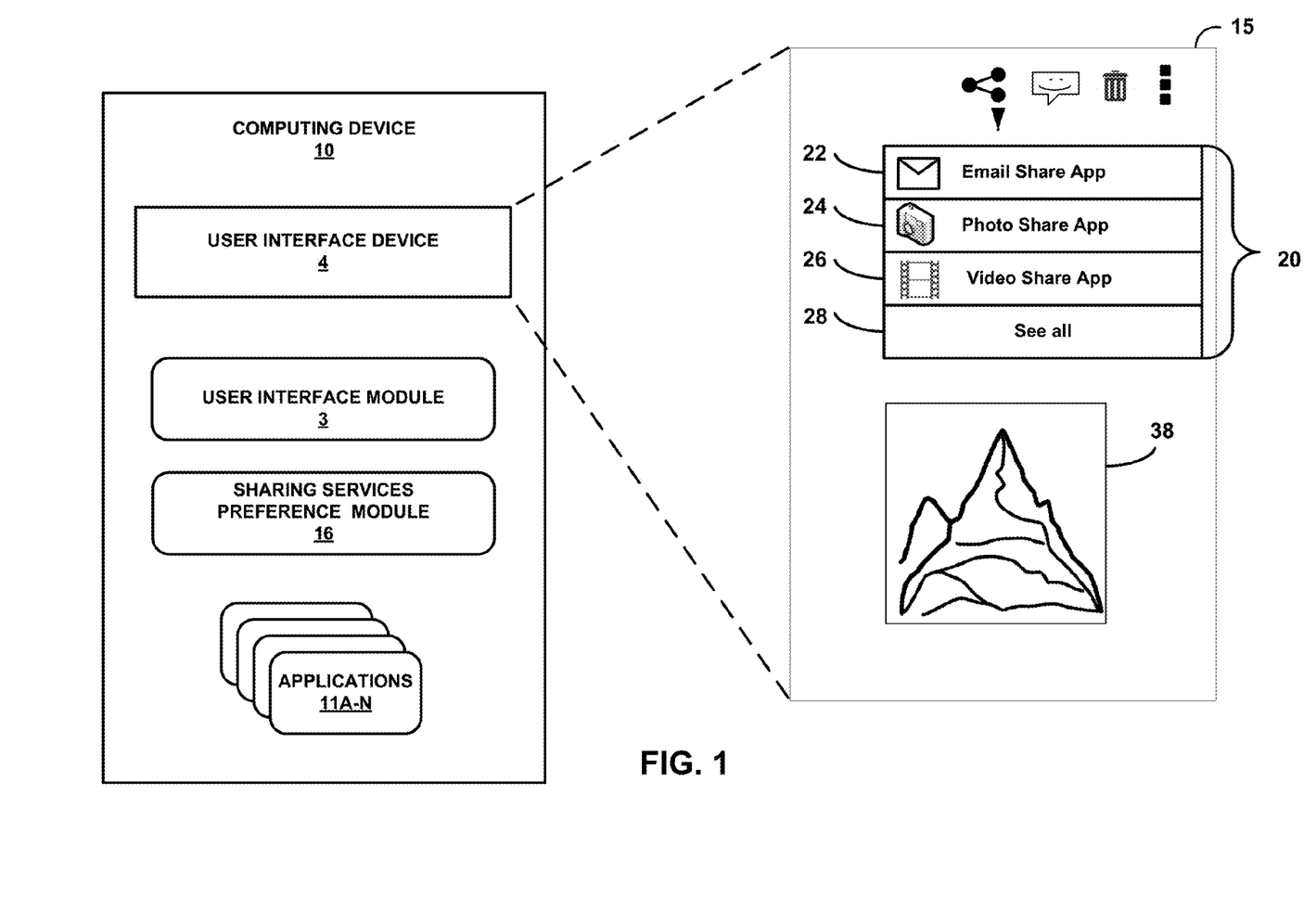
FIG. 1 is a conceptual diagram illustrating an example of a computing device configured to execute one or more of sharing service preference techniques, in accordance with one or more aspects of the present disclosure.

FIG. 1 is a conceptual diagram illustrating an example of a computing device configured to execute one or more of sharing service preference techniques, in accordance with one or more aspects of the present disclosure. As shown in FIG. 1, computing device 10 may be associated with user 2, and includes applications 11A-N (collectively, "applications 11"), sharing services preference module 16, and user interface device (UI) 4. In this disclosure, the use of "A-N" with respect to different reference numerals should not be understood to imply that there are necessarily an equal number of items for the depicted components. Instead, the letters "A-N" are used for purposes of illustration only.

Examples of computing device 10 may include, but are not limited to, portable or mobile devices such as mobile phones (including smartphones), laptop computers, desktop computers, tablet computers, smart television platform, personal digital assistants (PDAs), servers, mainframes, etc. As shown in the example of FIG. 1, computing device 10 may be a tablet computer. Computing device 10, in some examples, can include UI device 4, user interface (UI) module 6, sharing services preference module 16, and applications 11. Other examples of a computing device 10 that implement techniques of the disclosure may include additional components not shown in FIG. 1.

UI device 4 of computing device 10 may function as an input device for computing device 10 and as an output device. For instance, UI device 4 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UI device 4 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UI device 4 of computing device 10 may include a presence-sensitive screen that may receive tactile user input from a user of computing device 10. UI device 4 may receive the tactile user input by detecting one or more taps and/or gestures from a user of computing device 10 (e.g., the user touching or pointing to one or more locations of UI device 4 with a finger or a stylus pen). The presence-sensitive screen of UI device 4 may present output to a user. UI device 4 may present the output as a user interface (e.g., graphical user interface (GUI) 15), which may be related to functionality provided by computing device 10. For example, UI device 4 may present various functions and applications executing on computing device 10 such as an electronic message application, a map application, etc.

Computing device 10 may include user interface ("UI") module 6 and sharing services preferences module 16. Modules 6 and 16 may perform operations described herein using software, hardware, or a mixture of both hardware and software residing in and executing on computing device 10. Computing device 10 may execute modules 6 and 16 with multiple processors. Computing device 10 may execute modules 6 and 16 as a virtual machine executing on underlying hardware.

UI module 6 may receive data from components associated with computing device 10, such as sharing services preference module 16. Using the data, UI module 6 may cause other components associated with computing device 10, such as UI device 4, to provide output based on the data. For instance, UI module 3 may receive data from sharing service preference module 16 that causes UI device 4 to display suggested sharing services 20 at GUI 15.

Sharing services preference module 16 may include functionality to perform any variety of operations on computing device 10. Applications 11 may include a text application, photo viewer, social networking service, video application, email application, word processor, spreadsheet, web browser, multimedia player, server application, image capture application, audio application, etc. As described with respect the example of FIG. 1, sharing services preference module 16 may include functionality of a sharing service application that enable user 2 to share objects.

The term "object" as used herein is a broad term encompassing as its plain and ordinary meaning including, but not limited to, data files, photos, video recordings, audio recordings, documents, and combinations thereof. A file may be adapted to any data that a computing device is capable of capturing, receiving or storing. While this disclosure uses the non-limiting example of an image as a media object to illustrate various techniques of this disclosure, the techniques of this disclosure may be applied to other types of objects and are not limited to images.

As shown in FIG. 1, GUI 15 may include a user interface that allows user 2 to interact with computing device 10. GUI 15 may include graphical content, such as text, images, videos, or any other visually displayable graphical object. User 2 may interact with GUI 15 to share objects with other users. In one example, user 2 may share an image (e.g., image 38) that is currently displayed within GUI 15. Sharing services preference module 16 may receive information associated with the context of image 38 from one or more of applications 11. For example, the image capture application may send information about image 38 (e.g., the amount of space required to store image 38, the time and date that image 38 was taken, the geographic location at which image 38 was taken, the current location of computing device 10, textual or graphical tags associated with image 38, object recognition data associated with image 38, etc.). Sharing services preference module 16 may use the information to identify sharing services that the user is likely to prefer for sharing image 38.

Sharing services preference module 16 may determine which sharing services available on computing device 10 and, from the available sharing services, determine which sharing services user 2 is most likely to select or which sharing services may be particularly relevant for sharing image 38. For example, preferred sharing services may be frequently selected by the user, may be recently used, may have characteristics desired by the user (e.g., privacy or other content sharing controls), or may be relevant to a context of the computing device (e.g., a location, time of day, currently executing application, etc.).

Sharing services preference module 16 may select one or more of the sharing services available on computing device 10 as suggested sharing services. Suggested sharing services include the sharing services that sharing services preferences module 16 determines that a user would likely select for sharing an object. In some examples, one or more of applications 11 provides sharing services from which sharing services preference module 16 selects as suggested sharing services. For example, application 11A may provide functionality that enables user 2 to share a video and application 11A may provide functionality that enables user 2 to share objects via email. Other applications, websites, services, etc. provided by other computing devices communicatively coupled to computing device 10 (e.g., using a computer network) may provide additional sharing service functionality not provided by applications 11, but which can be selected by sharing services preference module 16 for presentation to user 2 as suggested sharing services.

Sharing services preference module 16 may select sharing services as suggested sharing services based on a weighted probability for calculated for each sharing service available to computing device 10. The weighted probability may, in one example, correspond to a likelihood that user 2 will select the respective sharing service for sharing an particular object.

Sharing services preference module 16 may determine a weighted probability that indicates a probability that the user may likely select a respective sharing service to share the object with at that particular time. The computing device may base the weighted probability for each sharing service on information about the object being shared, characteristics of each sharing service, and a context of the computing device. In generating the weighted probability, sharing services preference module 16 may be configured to more heavily weight certain factors, such as prior user sharing service selections, than other factors, such as the time of day.

Sharing services module 16 applies weighting factors to each piece of information included in the weighted probability calculation and generates a weighted probability for each of the available sharing services. For example, the information about the object being shared may include a type of the object, a size of the object, content associated with the object, previous sharing services selected by user 2 when sharing a similar object, etc. The characteristics of each sharing service may include privacy controls provided by each sharing service, a type of object the sharing service is configured to share, file size limitations imposed by the sharing service, among other characteristics.

Responsive to determining the weighted probability for each of the sharing services, sharing services preference module 16 may select sharing services having a respective weighted probability value greater than a threshold value to be included as a sharing service options within GUI 15. In one example, the threshold value may be a configurable threshold determined prior to sharing services preference module 16 determining the weighted probability values for each sharing service. In another example, the threshold value may be dynamically determined based on the calculated weighted probability values such that only the top three, five, or some other configurable number of sharing services that have weighted probability values that meet or exceed the threshold value.

Sharing services preference module 16 provides the selected sharing service information to UI module 3 and UI module 3 outputs an updated user interface (e.g., GUI 15) for display at UI device 4. Responsive to receiving a selection of a sharing service (e.g., sharing service 24), the corresponding sharing service available to computing device 10 shares the object (e.g., image 38). Sharing services preference module 16 receives an indication of the selection and stores information about the selection for later retrieval and inclusion in determining weighted probabilities for the next time suggested sharing services 20 is generated by sharing services preference module 16.

In instances in which sharing services preference module 16 my collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by computing device 2 or other computing devices.

Figure 2:
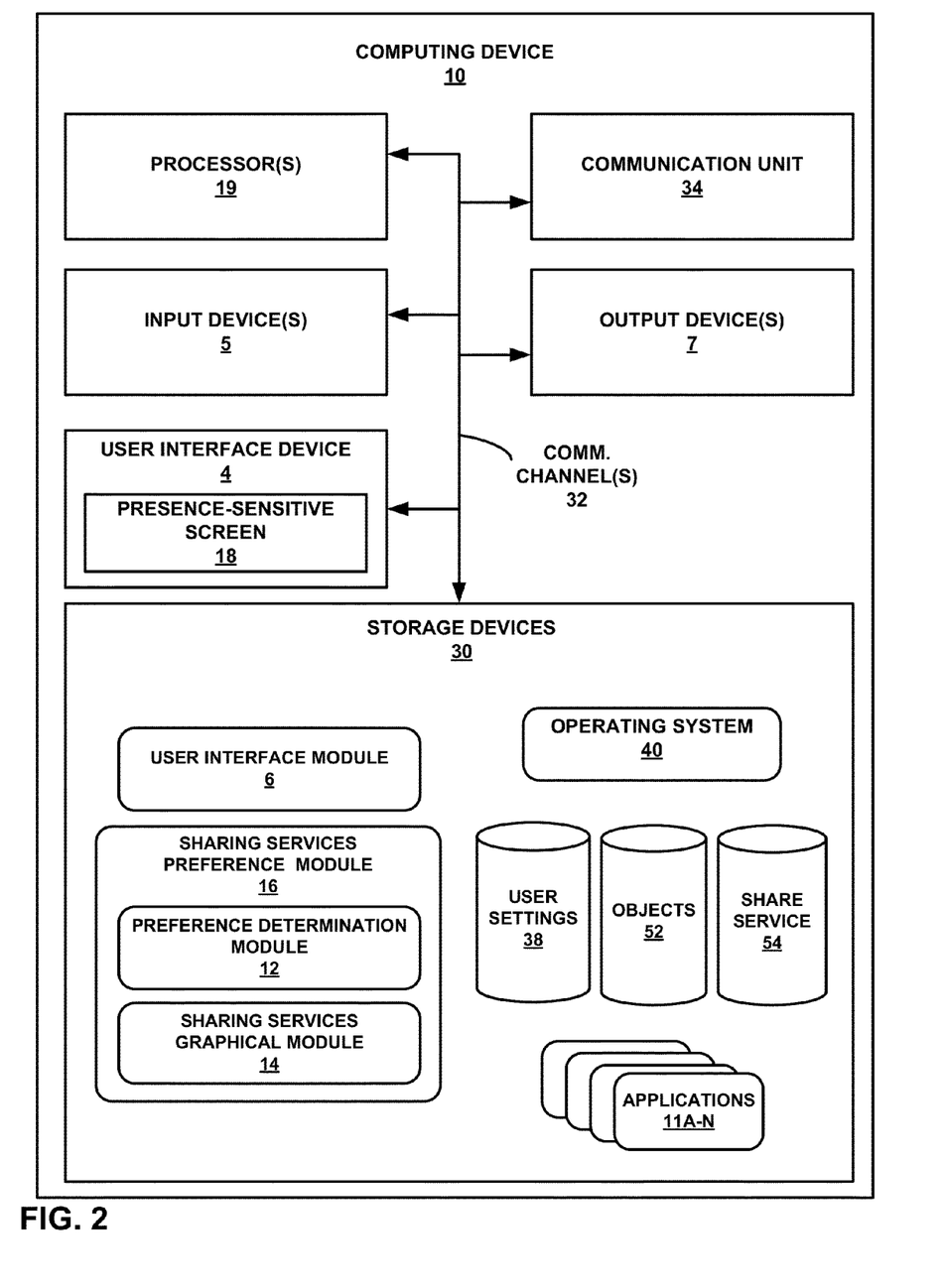
FIG. 2 is a block diagram illustrating an example of a computing device for managing sharing services, in accordance with one or more aspects of the present disclosure.

FIG. 2 is a block diagram illustrating further details of one example of a computing device shown in FIG. 1, in accordance with one or more aspects of the present disclosure. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 4 ("UID 4"), one or more processors 19, one or more input devices 5, one or more communication units 34, one or more output devices 7, and one or more storage devices 30. In this example, UID 4 also includes presence-sensitive display 18 while storage devices 30 of computing device 10 also include user interface (UI) module 6, sharing service preference module 16, application modules 11, operating system 40, user settings 38, objects 52, and share service data 54. Communication channels 32 may interconnect each of the components 4, 5, 7, 19, 30, and 34 for inter-component communications (physically, communicatively, and/or operatively). In some examples, communication channels 32 may include a system bus, a network connection, an inter-process communication data structure, or any other method for communicating data.

One or more input devices 5 of computing device 10 may receive input. Examples of input are tactile, audio, and video input. Input devices 5 of computing device 10, in one example, includes a presence-sensitive display (e.g., presence-sensitive display 18), touch-sensitive screen, mouse, keyboard, voice responsive system, video camera, microphone or any other type of device for detecting input from a human or machine.

One or more output devices 7 of computing device 10 may generate output. Examples of output are tactile, audio, and video output. Output devices 7 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 34 of computing device 10 may communicate with external devices via one or more networks by transmitting and/or receiving network signals on the one or more networks. For example, computing device 10 may use communication unit 34 to transmit and/or receive radio signals on a radio network such as a cellular radio network. Likewise, communication units 34 may transmit and/or receive satellite signals on a satellite network such as a GPS network. Examples of communication unit 34 include a network interface card (e.g. such as an Ethernet card), an optical transceiver, a radio frequency transceiver, a GPS receiver, or any other type of device that can send and/or receive information. Other examples of communication units 34 may include Bluetooth®, GPS, 3G, 4G, and Wi-Fi® radios found in mobile devices as well as Universal Serial Bus (USB) controllers.

UID 4 of FIG. 2 includes presence-sensitive display 18. Computing device 10 may use presence-sensitive display 18 as an input device and an output device. For example, presence-sensitive display 18 of UID 4 may include a touchscreen configured to receive tactile user input from a user of computing device 10. Presence-sensitive display 18 of UID 4 may also include an LED display capable of outputting visible information to the user of computing device 10. UID 4 may present a user interface on presence-sensitive display 18, such as sharing service GUI 15 of FIG. 1, that may be related to functionality provided by computing device 10. For example, presence-sensitive display 18 of UID 4 may present various functions and applications, such as an electronic message client, a map application, an Internet browser for accessing and downloading information from the Internet, and a social media application. In another example, presence-sensitive display 18 of UID 4 may present a menu of options related to the function and operation of computing device 10, such as screen brightness and other configurable mobile phone settings.

One or more storage devices 30 within computing device 10 may store information required for use during operation of computing device 10 (e.g., application modules 11 of computing device 10 may store information related to operation of the respective one of application modules 11). Storage devices 30, in some examples, have the primary purpose of being short term and not long-term computer-readable storage mediums. Storage devices 30 on computing device 10 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 30 may store program instructions and/or data associated with user interface module 6, sharing services preference module 16, operating system 40, and applications 11 (e.g., using one of user settings datastore 38, objects datastore 52, and share service datastore 54).

One or more processors 19 may implement functionality and/or execute instructions within computing device 10. For example, processors 19 on computing device 10 may read and execute instructions stored by storage devices 30 that execute the functionality of user interface module 6, sharing services preference module 16, operating system 40, and applications 11. These instructions executed by processors 19 may cause computing device 10 to store information within storage devices 30 during program execution, such as user settings, share service selection history, and/or objects generated by or associated with one or more of applications 11. Processors 19 may execute instructions of sharing services preference module 16 to determine a weighted probability for one or more sharing services and select one or more of the sharing services as suggested sharing services.

In accordance with techniques of the disclosure, sharing services preference module 16 may initially cause UI interface device 4 to display a graphical user interface that includes graphical elements, such as GUI 15 shown in FIG. 1. User 2 may select an image to share using a sharing service by, for example, taking a photo using computing device 10 or retrieving an image stored at objects 52. In response to selecting the image, sharing services preference module 16 identifies sharing services available to computing device 10 and various contextual identifiers. The contextual identifiers may include information about the image, information about the context of computing device 10, and characteristics of each sharing service. Share services preference module 16 may receive data from applications 11 regarding characteristics of the sharing service, such as what objects the service supports, other users associated with the service, and control of privacy for shared objects. Users may control whether sharing services preference module 16 may collect such information and may control whether and/or how the information may be used by computing device 10 or other computing devices.

Preference determination module 12 determines a weighted probability for each of the sharing services based on the contextual identifiers. The weighted probability corresponds to a predicted likelihood that the user will select that respective sharing service to share the image. Preference determination module 12 may identify the sharing services having a determined weighted probability value that is greater that a predetermined value (e.g., a threshold value) and send an indication of the identified sharing services to sharing services graphical module 14.

Sharing service graphical module 14 may generate a graphical representation of the identified sharing services, or subset of sharing services. The graphical representation may display the identified sharing services based on the weighted probability value. Sharing services graphical module 14 may send the graphical data for displaying the identified sharing services to user interface module 6. User interface device 4 may display the indication of the identified sharing services at presence-sensitive screen 18. For example, as illustrated in FIG. 1 as subset of sharing services 20.

UI device 4 may detect a touch gesture at a location of UI device 4 that displays subset of sharing services 20. UI device 4 may detect the touch gesture and, in response, UI module 6 may determine whether the touch gesture is at a location associated with one of the sharing services 22, 24, and 26, included in the graphical representation data sent by sharing service graphical module 14. When the touch gesture is within the predetermined distance or at a location of one of the identified sharing services 22-26, UI module 6 may cause UI device 4 to execute an application for the selected sharing service display graphical object 12 at a location of UI device 4 that corresponds to the touch gesture. User 2 may then be prompted to share the object, such as image 38, using the user selected sharing service 3. In one example, user 2 may select one of the sharing services for sharing the object, causing sharing services preference module 16 to send the object via communication unit 34 to a remote device, such as a remote server or another user's computing device. Sharing an object may cause preference determinations module 12 to send the weighted probability values to objects datastore 52 and share service datastore 54 for updating stored values associated with the selected sharing service. Preference determination module 12 may retrieve the weighted probability and updated values for suggesting sharing services for object sharing at a later time.

Figure 3A:
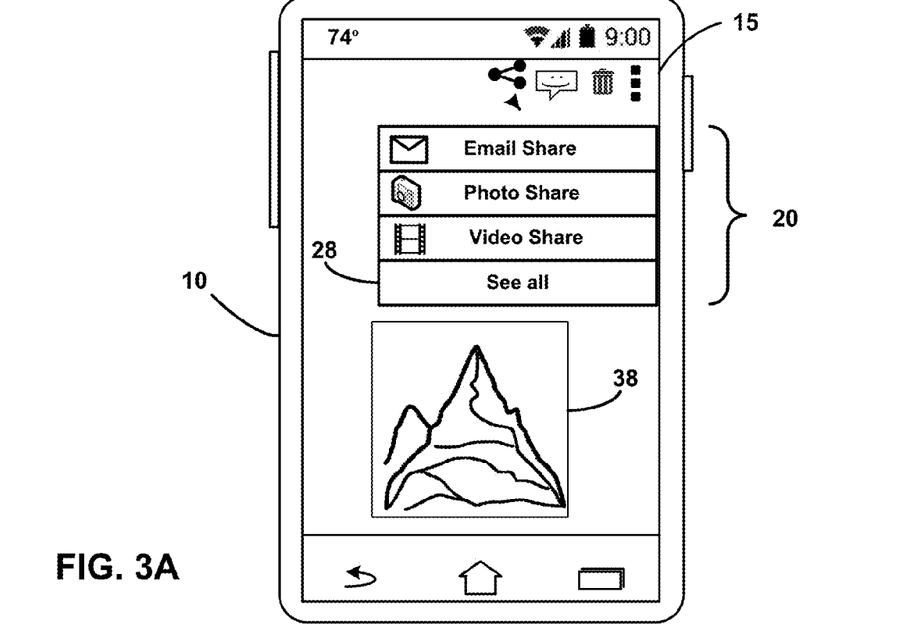
FIGS. 3A-3B are a conceptual diagrams illustrating example graphical user interfaces that include sharing service preferences, in accordance with one or more aspects of the present disclosure.
Figure 3B:
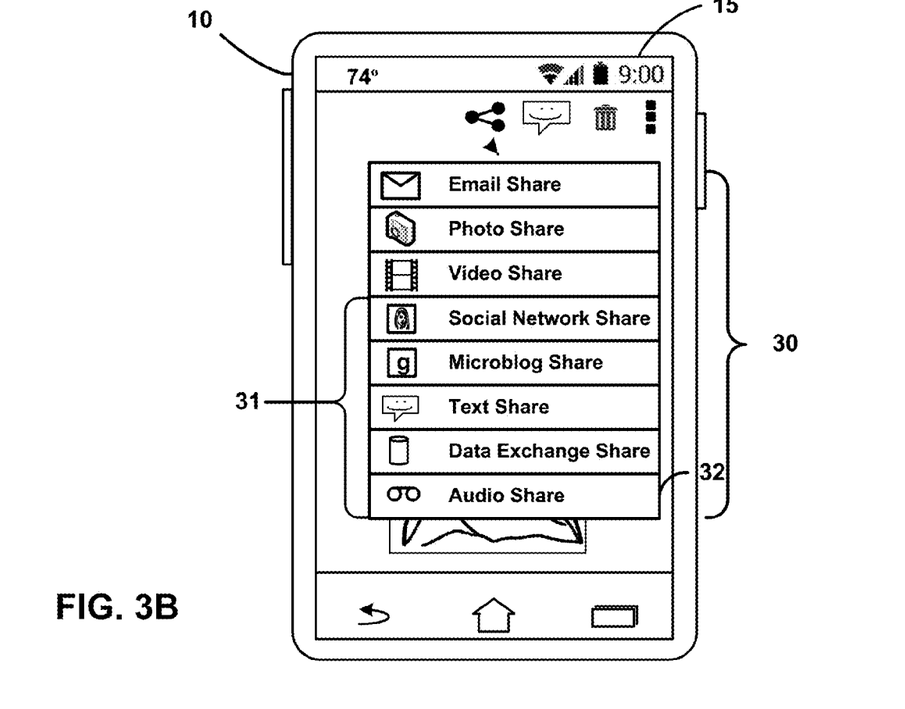

FIG. 3 is a conceptual diagram illustrating an example of a graphical user interface that includes sharing service preferences, in accordance with one or more aspects of the present disclosure. As shown in FIG. 3, computing device 10 includes components, such as UI device 4 (which may be a presence-sensitive screen). Components of computing device 2 can include functionality similar to functionality of such components as described in FIGS. 1 and 2.

In the example of FIG. 3A, GUI 15 displays subset of sharing services 20. Computing device 10 may display the subset as a list of sharing services. The GUI 15 may include an indication for seeing additional user services, such as "see all" button 28. When the user touches the presence-sensitive screen at the location of "see all" button 28, GUI 15 displays additional sharing services that are different from the subset of sharing services, for example, additional sharing services 31. Selecting "see all" button 28 allows user 2 to view sharing services with a probability value under the threshold value, so the user has maintains quick access to all of the possible sharing services available on computing device 10. For example, if user 2 adds a new application to computing device 10, sharing services preferences module 16 may not determine a high weighted probability value, because there is no use history associated with the new sharing service. However, user 2 will be able to quickly locate the newly added service by selecting "see all" button 28.

In another example, GUI 15 may display the list of sharing services, both the subset and the extended view of sharing services, in a scrollable format. The scrollable format enables user 2 to scroll through the list to expand the view to include all respective sharing services in longer lists.

In one example, computing device 10 may select sharing services to be included in the subset of sharing services based on more than one basis for determining if the sharing service should be selected. For example, the sharing services selected by computing device 10 for inclusion in the subset of sharing services may be sharing services that, historically, were frequently selected by the user and may have characteristics desired by the user (e.g., privacy or other content sharing controls). In addition, the respective sharing service may be relevant to a context of the computing device (e.g., a location, time of day, etc.). Computing device 10 may include all of these factors as contextual identifiers associated with one particular sharing service and send the contextual identifiers associated with the particular sharing service to preference determination module 12 for determination of the respective weighted probability of the related sharing service. Other contextual identifiers for basing the determination of the weighted probability may include object information, such as the amount of space required to store the object. The amount of space required to store the object may be expressed as a size of the object and may be expressed in terms of various units, such as bits, bytes, megabits, megabytes, gigabits, gigabytes, etc. For example, when object 38 is a video with a large number of bytes, preference determination module 12 will increase the weighted probability for a sharing service that supports larger files, such as video. The increased probability value may indicate that the sharing service is preferable for that object.

In another example, the contextual identifier associated with the object is based on the date, time, or other metadata associated with the object. For example, user 2 may execute a social networking application every Friday at 7 pm from home. Sharing services preference module 16 may send the date and time of use for a particular sharing service to preference determination module 12. Preference determination module 12 may receive information from operating system 40 that the current time is 7 pm on a Friday. Preference determination module 12 may then determine a high weighted probability value for the sharing service used regularly Friday evening at 7 pm. In other examples, sharing services preference module 16 may determine receive information from a calendar application, of applications 11, that Friday the birthday of user 2's mom. Preference determination module 12 will determine a higher probability value sharing services that user 2 executes to communicate with user 2's mom. In yet another example, user 2 may take a photo and tag the photo by inputting "me and mom." Based on the tag, preference determination module 12 will determine a higher probability value sharing services that user 2 executes to communicate with user 2's mom.

In one example, sharing service preference module 16 may identify that the object to be shared is a particular type, such as an image, document, audio, or other media object. Sharing service preference module 16 will determine which of the sharing services available on computing device 10 support sharing that identified type of object based on data stored with the sharing services application or based on the user's sharing history using the respective sharing service.

In another example, computing device 10 may base the weighted probability on a frequency of use associated with the respective sharing service. For example, increasing the probability value when the frequency of use is higher or decreasing the weighted value when the use of sharing service is less frequent. The weighted probability value may increase when the frequency of use is greater than a predetermined value, such as greater than twice a week. Similarly, the weighted probability value may decrease when the sharing service is used less than twice a month, or some other predetermined frequency. In yet another example, the weighted probability may increase or decrease based on the when the respective sharing service was last used. When computing device 10 determines that the respective sharing service has not been used recently, the weighted probability may decrease. Alternatively, if user 2 recently used the respective sharing service, then the weighted probability value may increase. For example, if user 2 did not use an email account in more than two months, then computing device 10 will decrease the weighted probability for that email application determining that user 2 does not prefer to use that email account. Computing device 10 may determine any predetermined period of time as a threshold to identify if the respective application was "recently" used.

In one example, determining the weighted probability includes determining objects that were shared with the respective sharing service. Computing device 10 may determine the user's history for sharing specific objects with a specific sharing service. Thus, computing device 10 learns or associates a particular service with a particular object type. When the user shares a photo, for example, with a photo sharing service, then the machine associates that photo with the service and will suggest the photo sharing service when the user takes a photo in the future and the computing device generates a list of preferred services.

In another example, the method for determining preferring sharing services in a specific context may further comprise identifying, by the computing device, an entity associated with the object, and when the computing device determines the weighted probability for the respective sharing service, increasing the weighted probability, by the computing device and based on the association of the identified object with the entity, for the respective sharing service. To illustrate this example, when the user takes a photo of a friend who communicates with user 2 via a particular social networking service, computing device 10 may determine that the friend's identification, by user input of object recognition techniques, and the association with the social networking service, by receiving association data from the social networking service. As a result, the weighted probability may increase due to the association of the friend with the social networking service.

In one example, selecting the subset of sharing services is based on a threshold that may be based on a predetermined value. Preference determination module 12 may set the value. The value may be a specific numerical value based on the weighted probability. The threshold may be based on a percentage of the weighted probability. Alternatively, the threshold may be a specific number of the "top" weighted probability values, for example, so the top three weighted probability values are selected.

In another example, selecting the subset of sharing services may be based on a weighted probability. Preference determination module 12 may select the subset of sharing services by determining a weighted probability by comparing a degree of similarity between the contextual identifiers the object and one or more characteristics associated with the respective sharing service. When the weighted probability is greater than the threshold, computing device 10 selects the respective sharing service for output at the graphical user interface. When the weighted probability is not greater than the predetermined value, computing device 10 refrains from selecting the respective sharing service for output at the graphical user interface.

In one example, the computing device performs operations. For example, an operation may include sharing the object with another user. Sharing the object may include determining a second, different user associated with the selected sharing service enabled to receive objects via the sharing service. Computing device 10 may then send an indication of the object to a computing device associated with the second user via the selected sharing service. After the object is shared, the computing device may store the weighted probability associated with the object and the selected sharing service, for example, in a memory, such as share service 54 and in objects 52. The stored data regarding the selected service for a particular object may be used for future sharing service preference determinations.

In one example, after an object has been shared, computing device 10 may use the stored data about the selected service for further sharing service preference determinations by incrementing the stored weighted probability associated with the object and the selected sharing service. Computing device 10 may access the weighted probability associated with the object and the respective sharing service when other objects for determining preferences.

Figure 4:
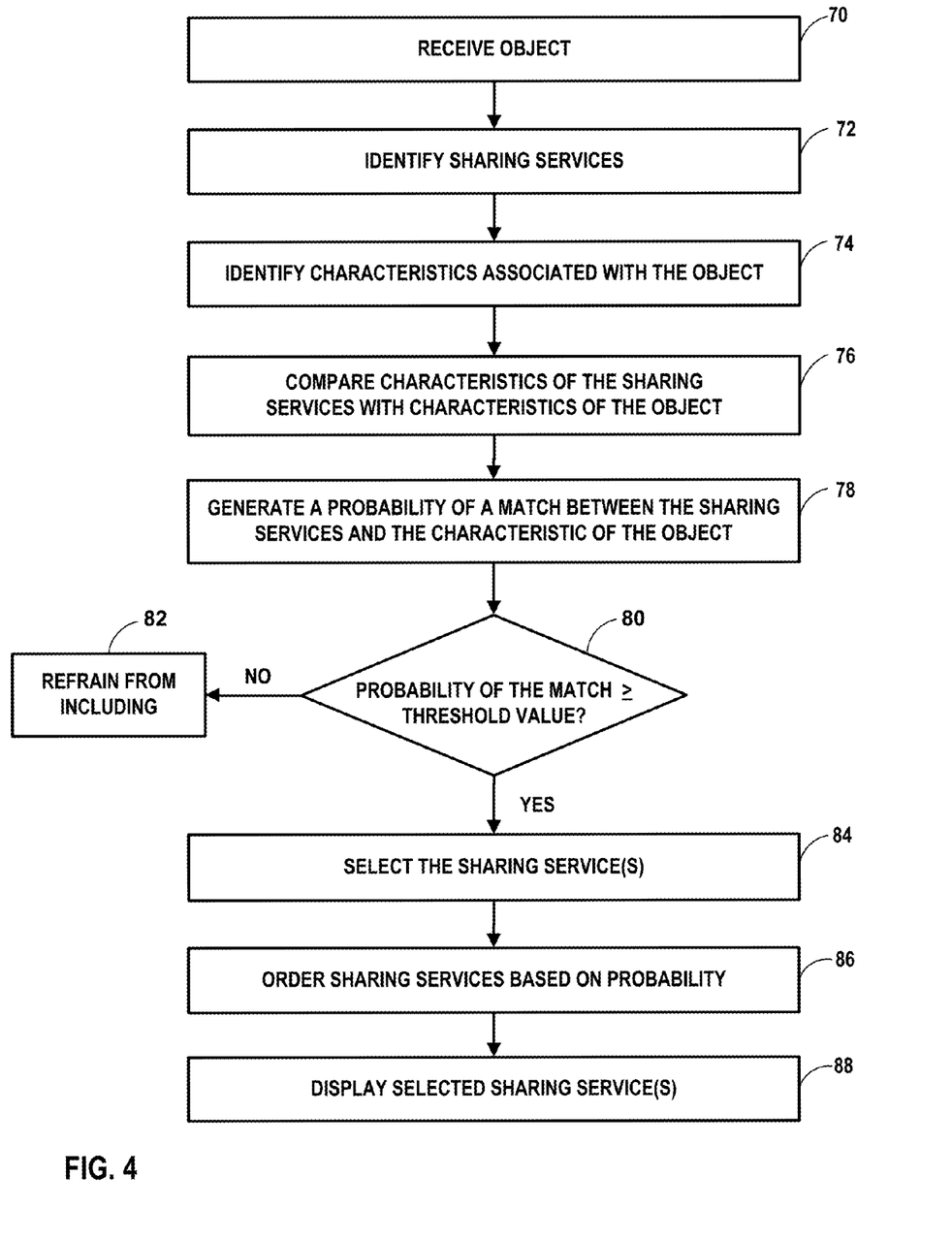
FIG. 4 is a flowchart illustrating an example operation for managing the selection and display of sharing services, in accordance with one or more aspects of the present disclosure.

FIG. 4 is a flowchart illustrating an example operation for managing the selection and display of sharing services, in accordance with one or more aspects of the present disclosure. For purposes of illustration only, the example operations are described below within the context of computing device 10 as shown in FIGS. 1 and 2.

Computing device 10 receives an object (70) for sharing. In various instances, the object may be retrieved from a data store of computing device 10, received from one or more input devices 5, or received using communication unit 34. The object may include an image, a video, an audio recording, or other data that may be shared by computing device 10 using a sharing service.

In some examples, computing device 10 maintains a weighted probability of a match for each sharing service suggested by sharing services preference module 16. The weighted probability may correspond to an association between the sharing service and an object of an image. For instance, a weighted probability may correspond to an association between a sharing service via a social networking service and the object, such as a photo. Weighted probabilities may be used, in accordance with techniques of the disclosure, to determine a propensity of user 2 to associate a particular object in a particular context with the sharing service.

In one example, computing device 10 may initially retrieve a list of suggested sharing services that user 2 may associate with an object previously uploaded by client device 10 (72). Sharing services preference module 16 may determine whether a probability exists for each suggested sharing service. If a probability does not exist between a suggested sharing service and the object, sharing services preference module 16 may generate a corresponding service matching score, or probability. In some examples, a probability may be a value in a range between 0-1. In some examples, a probability may be initialized to a value of 0.5.

Once sharing services preference module 16 locates the sharing service preferences, computing device 10 will determine the context of the computing device and identifying characteristics associated with the object (74). Sharing services preference module 16 may compare the determined data with the characteristics of the sharing services (76). Based on the comparison, sharing services preference module 16 may generate a probability of match between the respective sharing service and the image. In one example, sharing services preference module 16 may determine the probability based on a comparison of probabilities determined for previously shared object with the same respective sharing service (78). By comparing the indications, sharing service module 34 can determine if a selection of a sharing service made by a user matches a sharing service that was initially determined by server device 30. Sharing services preference module 16 may order the sharing services based on the resulting probability value.

Sharing services preference module 16 compares the determined probability value to a threshold value to determine which sharing services to select as suggested sharing services (80). By setting a threshold value, sharing services preference module 16 may filter the sharing services to improve the accuracy of the identified sharing service preferences. For each sharing service with a probability value that is lower than the threshold value ("NO" branch of 80), computing device 10 does not select the respective sharing service as a suggested sharing service and refrains from including the respective sharing service in GUI 15 (82). For each sharing service with a probability value that is greater the threshold value ("YES" branch of 80), sharing services preference module 16 selects the respective sharing service as a suggested sharing service (84). In some examples, sharing services preference module 16 orders the suggested sharing services based on the probability value (86). Computing device 10 displays the selected preferences at a graphical user interface (88).

Figure 5:
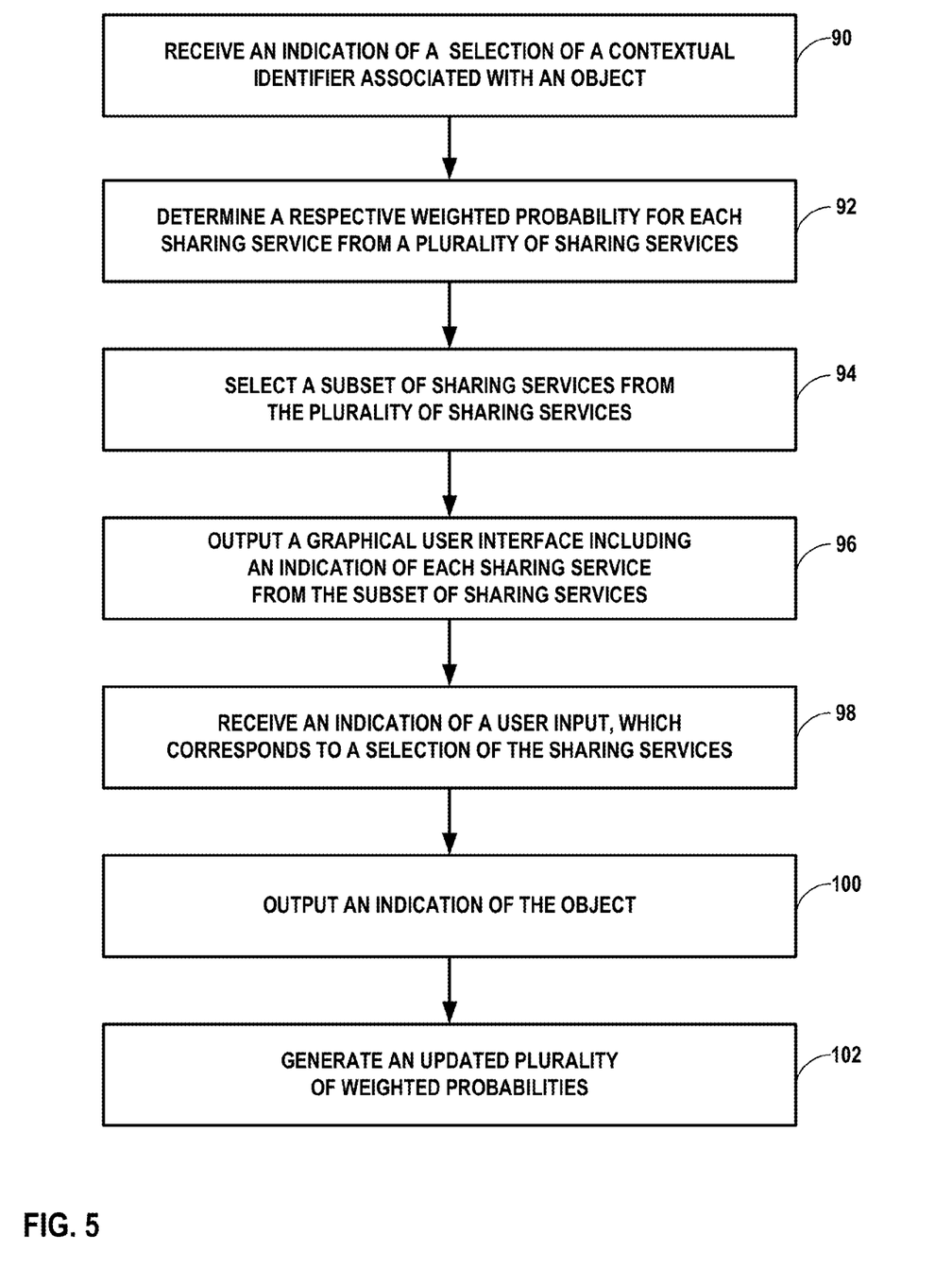
FIG. 5 is a flowchart illustrating another example operation for managing the selection and display of sharing services, in accordance with one or more aspects of the present disclosure.

FIG. 5 is a flowchart illustrating another example operation for managing the selection and display of sharing services, in accordance with one or more aspects of the present disclosure. For purposes of illustration only, the example operations are described below within the context of client device 10 as shown in FIGS. 1 and 2.

In one example, computing device 10 receives a selection of a contextual identifier associated with an object (90). Based on the contextual identifier, computing device 10 may determine a respective weighted probability for each sharing service of a plurality of sharing services (92). Computing device 10 may select a subset of sharing services from the plurality of sharing services based on the respective weighted probabilities (94). Based on the selected sharing service, computing device 10 may output an indication of the object (96). Computing device 10 may receive an indication of a user input detected at the presence-sensitive display (98). The user input received may correspond to a selection of one or the sharing services from the subset of sharing services (98). Based on the selected sharing service, computing device 10 may output an indication of the object (100). Computing device 10 may also generate an updated plurality of weighted probabilities that are based on the respective weighed probabilities and the selection (102).

In one example, the operation may include the indication comprises a list of sharing services. In another example, the list of sharing services is scrollable. In yet another example, operations may include may display additional indications different from the subset of sharing services in response to the received indication of the user input.

In another example, the operations may include receiving the indication of the user input displays, by the computing device and for display at the presence-sensitive display, additional indications different from the subset of sharing services. In one example, the sharing services may be based on more than one basis for determining if the sharing service should be selected. In another example, the operations may further include receiving the selection of the contextual selecting associated with the object includes data associated with the number of bytes of the object.

In one example, the operations may include determining the contextual identifier associated with the object based on the date, time, or other metadata associated with the object. In another example, the operations may further include identifying the object as at least one of an image, document, audio, or other media object.

In one example, the operations may include, for determining the respective weighted probability includes, determining a frequency of use associated with the respective sharing service. In another example, the operation may include determining the respective weighted probability, including determining when the respective sharing service was last used. In another example, the operations may include determining the respective weighted probability by determining objects that were shared with the respective sharing service.

In one example, the operations may include identifying, by the computing device, an entity associated with the object, and when the computing device determines the respective weighted probability for the respective sharing service, increasing the weighted probability, by the computing device and based on the association of the identified object with the entity, for the respective sharing service. In another example, the operations may further include selecting the subset of sharing services based on a threshold that is based on a pre-determined value. In yet another example, the operations may further include selecting the subset of sharing services is based on the respective weighted probability, wherein the selecting the subset of sharing services includes comparing a degree of similarity between the contextual identifiers the object and one or more characteristics associated with the respective sharing service, and when the respective weighted probability is greater than the threshold, selecting, by the computing device, the respective sharing service for output at the graphical user interface.

In one example, the operations may include selecting the subset by refraining from selecting, by the computing device, the respective sharing service for output at the graphical user interface, when the weighted probability is not greater than the predetermined value.

In another example, the operations may include outputting the indication of the object by determining, by the computing device, a second user associated with the selected sharing service enabled to receive objects via the sharing service, and sending, by the computing device, an indication of the object to a computing device associated with the second user via the selected sharing service. In another example, the operations may include outputting the indication of the object further comprises storing, at the computing device, the weighted probability associated with the object and the selected sharing service. In another example, the operations may further include performing the operation, by further incrementing, by the computing device, the stored weighted probability associated with the object and the selected sharing service.

Figure 6:
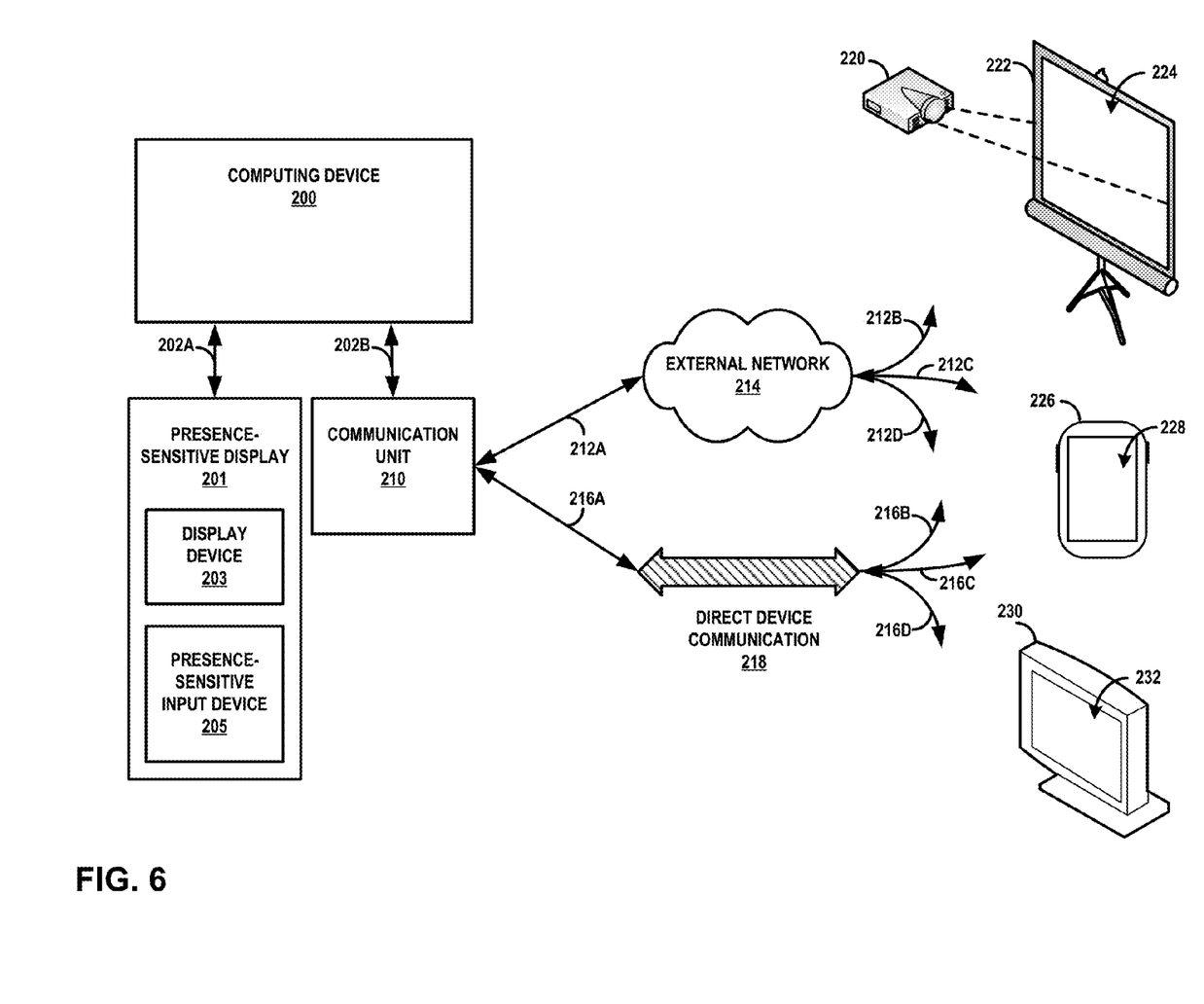
FIG. 6 is a block diagram illustrating an example computing device that outputs graphical content for display at a remote device, in accordance with one or more techniques of the present disclosure.

FIG. 6 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 6 includes a computing device 200, presence-sensitive display 201, communication unit 210, projector 220, projector screen 222, tablet device 226, and visual display device 230. Although shown for purposes of example in FIGS. 1 and 2 as a stand-alone computing device, a computing device may, generally, be any component or system that includes a processor or other suitable computing environment for executing software instructions and, for example, need not include a presence-sensitive display.

As shown in the example of FIG. 6, computing device 200 may be a processor that includes functionality as described with respect to processor 19 in FIG. 2. In such examples, computing device 200 may be operatively coupled to presence-sensitive display 201 by a communication channel 202A, which may be a system bus or other suitable connection. Computing device 200 may also be operatively coupled to communication unit 210, further described below, by a communication channel 202B, which may also be a system bus or other suitable connection. Although shown separately as an example in FIG. 6, computing device 200 may be operatively coupled to presence-sensitive display 201 and communication unit 210 by any number of one or more communication channels.

In other examples, such as illustrated previously in FIGS. 1-2, computing device 200 may be a portable or mobile device such as mobile phones (including smart phones), laptop computers, etc. In some examples, computing device 200 may be a desktop computers, tablet computers, smart television platforms, cameras, personal digital assistants (PDAs), servers, mainframes, etc.

Presence-sensitive display 201, as shown in FIG. 6, may include display device 203 and presence-sensitive input device 205. Display device 203 may, for example, receive data from computing device 200 and display the graphical content. In some examples, presence-sensitive input device 205 may determine one or more user inputs (e.g., continuous gestures, multi-touch gestures, single-touch gestures, etc.) at presence-sensitive display 201 using capacitive, inductive, and/or optical recognition techniques and send indications of such user input to computing device 200 using communication channel 202A. In some examples, presence-sensitive input device 205 may be physically positioned on top of display device 203 such that, when a user positions an input unit over a graphical element displayed by display device 203, the location at which presence-sensitive input device 205 corresponds to the location of display device 203 at which the graphical element is displayed.

As shown in FIG. 6, computing device 200 may also include and/or be operatively coupled with communication unit 210. Communication unit 210 may include functionality of communication unit 34 as described in FIG. 2. Examples of communication unit 210 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 200 may also include and/or be operatively coupled with one or more other devices, e.g., input devices, output devices, memory, storage devices, etc. that are not shown in FIG. 6 for purposes of brevity and illustration.

FIG. 6 also illustrates a projector 220 and projector screen 222. Other such examples of projection devices may include electronic whiteboards, holographic display devices, and any other suitable devices for displaying graphical content. Projector 220 and project screen 222 may include one or more communication units that enable the respective devices to communicate with computing device 200. In some examples, the one or more communication units may enable communication between projector 220 and projector screen 222. Projector 220 may receive data from computing device 200 that includes graphical content. Projector 220, in response to receiving the data, may project the graphical content onto projector screen 222. In some examples, projector 220 may determine one or more user inputs (e.g., continuous gestures, multi-touch gestures, single-touch gestures, etc.) at projector screen using optical recognition or other suitable techniques and send indications of such user input using one or more communication units to computing device 200.

Projector screen 222, in some examples, may include a presence-sensitive display 224. Presence-sensitive display 224 may include a subset of functionality or all of the functionality of UI device 4 as described in this disclosure. In some examples, presence-sensitive display 224 may include additional functionality. Projector screen 222 (e.g., an electronic whiteboard), may receive data from computing device 200 and display the graphical content. In some examples, presence-sensitive display 224 may determine one or more user inputs (e.g., continuous gestures, multi-touch gestures, single-touch gestures, etc.) at projector screen 222 using capacitive, inductive, and/or optical recognition techniques and send indications of such user input using one or more communication units to computing device 200.

FIG. 6 also illustrates tablet device 226 and visual display device 230. Tablet device 226 and visual display device 230 may each include computing and connectivity capabilities. Examples of tablet device 226 may include e-reader devices, convertible notebook devices, hybrid slate devices, etc. Examples of visual display device 230 may include televisions, computer monitors, etc. As shown in FIG. 6, tablet device 226 may include a presence-sensitive display 228. Visual display device 230 may include a presence-sensitive display 232. Presence-sensitive displays 228, 232 may include a subset of functionality or all of the functionality of UI device 4 as described in this disclosure. In some examples, presence-sensitive displays 228, 232 may include additional functionality. In any case, presence-sensitive display 232, for example, may receive data from computing device 200 and display the graphical content. In some examples, presence-sensitive display 232 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 200.

As described above, in some examples, computing device 200 may output graphical content for display at presence-sensitive display 201 that is coupled to computing device 200 by a system bus or other suitable communication channel. Computing device 200 may also output graphical content for display at one or more remote devices, such as projector 220, projector screen 222, tablet device 226, and visual display device 230. For instance, computing device 200 may execute one or more instructions to generate and/or modify graphical content in accordance with techniques of the present disclosure. Computing device 200 may output the data that includes the graphical content to a communication unit of computing device 200, such as communication unit 210. Communication unit 210 may send the data to one or more of the remote devices, such as projector 220, projector screen 222, tablet device 226, and/or visual display device 230. In this way, computing device 200 may output the graphical content for display at one or more of the remote devices. In some examples, one or more of the remote devices may output the graphical content at a presence-sensitive display that is included in and/or operatively coupled to the respective remote devices.

In some examples, computing device 200 may not output graphical content at presence-sensitive display 201 that is operatively coupled to computing device 200. In other examples, computing device 200 may output graphical content for display at both a presence-sensitive display 201 that is coupled to computing device 200 by communication channel 202A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 200 and output for display at presence-sensitive display 201 may be different than graphical content display output for display at one or more remote devices.

Computing device 200 may send and receive data using any suitable communication techniques. For example, computing device 200 may be operatively coupled to external network 214 using network link 212A. Each of the remote devices illustrated in FIG. 6 may be operatively coupled to network external network 214 by one of respective network links 212B, 212C, and 212D. External network 214 may include network hubs, network switches, network routers, etc., that are operatively inter-coupled thereby providing for the exchange of information between computing device 200 and the remote devices illustrated in FIG. 6. In some examples, network links 212A-212D may be Ethernet, ATM or other network connections. Such connections may be wireless and/or wired connections.

In some examples, computing device 200 may be operatively coupled to one or more of the remote devices included in FIG. 6 using direct device communication 218. Direct device communication 218 may include communications through which computing device 200 sends and receives data directly with a remote device, using wired or wireless communication. That is, in some examples of direct device communication 218, data sent by computing device 200 may not be forwarded by one or more additional devices before being received at the remote device, and vice-versa. Examples of direct device communication 218 may include Bluetooth, Near-Field Communication, Universal Serial Bus, WiFi, infrared, etc. One or more of the remote devices illustrated in FIG. 6 may be operatively coupled with computing device 200 by communication links 216A-216D. In some examples, communication links 212A-212D may be connections using Bluetooth, Near-Field Communication, Universal Serial Bus, infrared, etc. Such connections may be wireless and/or wired connections.

In accordance with techniques of the disclosure, computing device 200 may receive an indication of a selection of a contextual identifier associated with an object. Based on the object and the selected contextual identifier, computing device 200 may determine a respective determined probability for each sharing service from a plurality of sharing services. Computing device 200 may select a subset of sharing services from the plurality of sharing services based on the respective weighted probabilities and output, for display, a GUI that includes an indication of each sharing service from the subset of sharing services. In some examples, computing device 200 may output the GUI for display at any one or more of presence-sensitive display 201, display device 203, projector 220, tablet device 226, and/or visual display device 230. Computing device 200 may receive an indication of a user input that may correspond to a selection of one of the sharing services from the subset of sharing services, output an indication of the object based on the selected sharing service, and generate an updated plurality of weighted probabilities based on the selection and the respective weighted probabilities.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), central processing units (CPUs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   determining, by a computing device and based a type of an object, a plurality of sharing services, wherein each sharing service of the plurality of sharing services supports sharing of object of a same type as the object, and wherein each sharing service from the plurality of sharing services is provided by one or more applications that are either executable by or accessible to the computing device;
   determining, by the computing device and based on a context associated with the object, a plurality of weighted probabilities, each respective weighted probability from the plurality of weighted probabilities being associated with a respective sharing service from the plurality of sharing services, wherein the context includes at least one of a characteristic of the object or a characteristic of at least a portion of sharing services from the plurality of sharing services;
   selecting, by the computing device and based on the plurality of weighted probabilities, a subset of sharing services from the plurality of sharing services;
   outputting, by the computing device and for display, a graphical user interface including a respective indication of each sharing service from the subset of sharing services;
   receiving, by the computing device, an indication of a user input, the user input corresponding to a selection of a particular sharing service from the subset of sharing services; and
   transmitting, by the computing device and to the particular sharing service, an indication of the object.

2. The method of claim 1, further comprising:
   generating, by the computing device, based on the plurality of weighted probabilities and the selection of the particular sharing service from the plurality of sharing services, an updated plurality of weighted probabilities;
selecting, by the computing device and based on the updated plurality of weighted probabilities, an updated subset of sharing services from the plurality of sharing services;
outputting, by the computing device and for display, a respective indication of each sharing service from the updated subset of sharing services.

3. The method of claim 1, wherein the context associated with the object includes a data size of the object.

4. The method of claim 1, wherein the characteristic of the object includes at least one of a date, a time, and other metadata associated with the object.

5. The method of claim 1, further comprising determining, by the computing device, the context associated with the object.

6. The method of claim 1, wherein determining the respective weighted probability comprises determining a respective frequency of use associated with each sharing service from the plurality of sharing services.

7. The method of claim 1, wherein determining the respective weighted probability includes determining when each sharing service from the plurality of sharing services was last selected.

8. The method of claim 1, wherein determining the respective weighted probability includes determining one or more characteristics of objects that were previously shared using at least one sharing service from the plurality of sharing services.

9. The method of claim 1, further comprising identifying, by the computing device, an entity associated with the object, wherein determining the respective weighted probability for the respective sharing service comprises adjusting, based on the entity associated with the object, the respective weighted probability for each sharing service.

10. The method of claim 1, wherein selecting the first subset of sharing services comprises, responsive to determining that the respective weighted probability for a corresponding sharing service from the plurality of sharing services satisfies a threshold, selecting the corresponding sharing service for inclusion in the first subset of sharing services.

11. The method of claim 1, wherein selecting the first subset of sharing services comprises, responsive to determining that the respective weighted probability for a corresponding sharing service from the plurality of sharing services does not satisfy a threshold, refraining from selecting, by the computing device, the corresponding sharing service for inclusion in the first subset of sharing services.

12. The method of claim 1, wherein the user input is a first user input, the method further comprising:
prior to transmitting the indication of the object:
receiving, by the computing device, an indication of a second user input, the second user input corresponding to a selection of a graphical element associated with a request for respective indications of each sharing service of a second subset of sharing services from the plurality of sharing services, wherein the second subset of sharing services is different from the first subset of sharing services; and
responsive to receiving the indication of the second user input, outputting, by the computing device and for display, an indication of at least one sharing service from the second subset of the plurality of sharing services.

13. A non-transitory computer-readable storage medium is encoded with instructions that, when executed, cause one or more processors of a computing device to:
determine, based a type of an object, a plurality of sharing services, wherein each sharing service of the plurality of sharing services supports sharing of objects of a same type as the object, and wherein each sharing service from the plurality of sharing services is provided by one or more applications that are either executable by or accessible to the computing device;
determine, based on a context associated with the object, a plurality of weighted probabilities, each respective weighted probability from the plurality of weighted probabilities being associated with a respective sharing service from the plurality of sharing services, wherein the context includes at least one of a characteristic of the object or a characteristic of at least a portion of sharing services from the plurality of sharing services;
select, based on the respective weighted probabilities, a subset of sharing services from the plurality of sharing services;
output, for display, a respective indication of each sharing service from the subset of sharing services;
receive an indication of a user input, the user input corresponding to a selection of a particular sharing service from the subset of sharing services; and
transmit, to the particular sharing service, an indication of the object.

14. The non-transitory computer-readable storage medium of claim 13, wherein the instructions, when executed, cause one or more processors of a computing device to:
generate, based on the plurality of weighted probabilities and the selection of the particular sharing service from the plurality of sharing services, an updated plurality of weighted probabilities;
select, based on the updated plurality of weighted probabilities, an updated subset of sharing services from the plurality of sharing services; and
output, for display, a respective indication of each sharing service from the updated subset of sharing services.

15. The non-transitory computer-readable storage medium of claim 13, wherein the instructions, when executed, cause one or more processors of a computing device to determine the respective weighted probability by at least determining a respective frequency of use associated with each sharing service from the plurality of sharing services.

16. The non-transitory computer-readable storage medium of claim 13, wherein the instructions, when executed, cause one or more processors of a computing device to determine the respective weighted probability by at least determining when each sharing service from the plurality of sharing services was last selected.

17. The non-transitory computer-readable storage medium of claim 13, wherein the instructions, when executed, cause one or more processors of a computing device to, prior to transmitting the indication of the object:
receive an indication of a second user input, the second user input corresponding to a selection of a graphical element associated with a request for respective indications of each sharing service of a second subset of sharing services from the plurality of sharing services, wherein the second subset of sharing services is different from the first subset of sharing services; and
responsive to receiving the indication of the second user input, output, for display, an indication of at least one sharing service from the second subset of the plurality of sharing services.

18. A computing system, comprising:
a display device; and
one or more processors configured to:
- determine, based a type of an object, a plurality of sharing services, wherein each sharing service of the plurality of sharing services supports sharing of objects of a same type as the object, and wherein each sharing service from the plurality of sharing services is provided by one or more applications that are either executable by or accessible to the computing device;
- determine, based on a context associated with the object, a plurality of weighted probabilities, each respective weighted probability from the plurality of weighted probabilities being associated with a respective sharing service from the plurality of sharing services, wherein the context includes at least one of a characteristic of the object or a characteristic of at least a portion of sharing services from the plurality of sharing services;
- select, based on the respective weighted probabilities, a subset of sharing services from the plurality of sharing services;
- output, for display at the display device, a respective indication of each sharing service from the subset of sharing services;
- receive an indication of a user input, the user input corresponding to a selection of a particular sharing service from the subset of sharing services; and
- transmit, to the particular sharing service, an indication of the object.

19. The computing system of claim 18, wherein the one or more processors are configured to:
- generate, based on the plurality of weighted probabilities and the selection, an updated plurality of weighted probabilities;
- select, based on the updated plurality of weighted probabilities, an updated subset of sharing services from the plurality of sharing services; and
- output, for display, a respective indication of each sharing service from the updated subset of sharing services.

20. The computing system of claim 18, wherein the one or more processors are configured to, prior to transmitting the indication of the object:
- receive an indication of a second user input, the second user input corresponding to a selection of a graphical element associated with a request for respective indications of each sharing service of a second subset of sharing services from the plurality of sharing services, wherein the second subset of sharing services is different from the first subset of sharing services; and
- responsive to receiving the indication of the second user input, output, for display, an indication of at least one sharing service from the second subset of the plurality of sharing services.

* * * * *